June 5, 1934. J. E. McCONNELL 1,961,234
MEASURING DEVICE OR GAUGE
Filed May 9, 1931
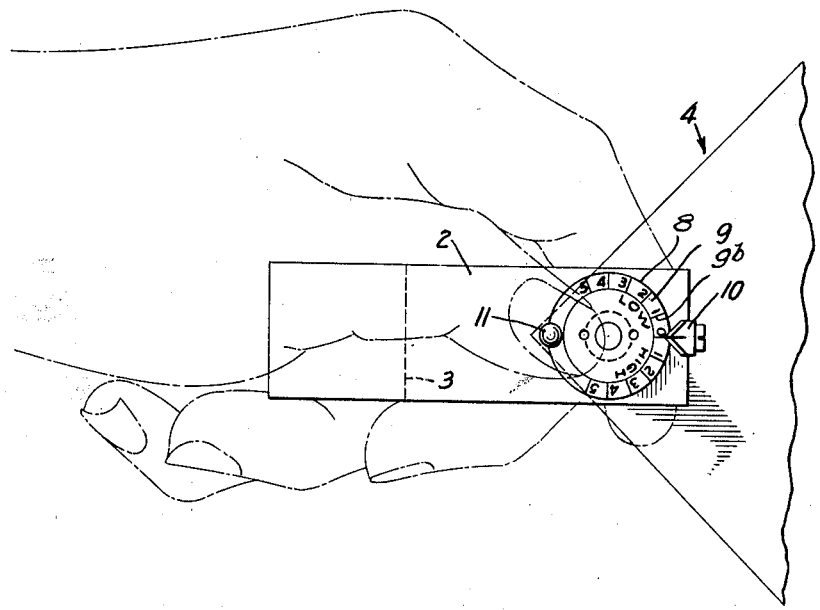
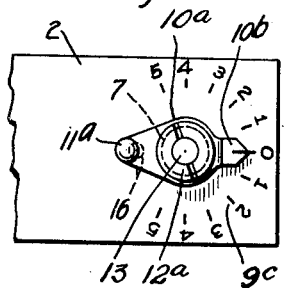
INVENTOR
Joseph E. McConnell.
BY
John Waldheim
ATTORNEY Patented June 5, 1934

1,961,234

UNITED STATES PATENT OFFICE 1,961,234

MEASURING DEVICE OR GAUGE

Joseph E. McConnell, Newark, N. J.

Application May 9, 1931, Serial No. 536,174

5 Claims. (Cl. 33—164)

This invention relates to measuring devices or gauges and more particularly to type high gauges which are used by printers to indicate the inaccuracies in the thickness of printing plates.

The printing plates are assembled in a frame or chase with the types. This is done on a printer's stone (flat table) with the printing faces up so that the faces of the types and the face of the printing plate are in the same plane. It is therefore necessary that the back of the printing plate be exactly parallel with its face and that the thickness thereof correspond to the height of the types.

The printer therefore, before he puts the plate into the chase, has heretofore used a fixed bifurcated gauge of a fixed dimension corresponding to the standard thickness of plate, with which he gauged each corner of the plate and if it was found under-size, one or more layers of paper were pasted on the back of the plate to bring it up to thickness.

He then clamped the plate in the frame and tried it in the press. If the plate did not print uniformly it was necessary to take it out of the frame and increase the thickness by pasting on more paper, where required. This cut-and-try method used heretofore was not only expensive but also unreliable.

The present invention provides a gauge including an adjustable screw, and a scale and pointer whereby the number of thicknesses of sheets of paper required to build up the plate, is indicated directly. This distinguishes it from the usual micrometer gauge in that, instead of indicating thousandths of an inch, which is discouraging to a printer, it indicates the number of thicknesses of paper required to build up the plate to the necessary thickness, the usual thickness of ordinary paper being about .003 of an inch.

A feature of the invention relates to means for keeping the screw within the range of adjustment.

Another feature relates to means to afford an adjustment between the screw and the indicating means.

Other features and advantages will hereinafter appear.

In the drawing which forms part of the specification,

Fig. 1 is a top plan view of the novel gauge showing one corner of a printing plate therein;

Fig. 2 is a side elevation of Fig. 1;

Fig. 3 is a detail view of the screw, partly in section;

Fig. 4 is a view illustrating a modified form of screw; and

Fig. 5 is a fragmentary, top plan view of a modified form of scale and pointer for the screw.

Similar reference characters refer to similar parts throughout.

The gauge 1 includes two arms 2 and 2ª secured, in any convenient manner as by screws, rivets, brazing or electric welding, to a spacer block 3. The printing plate 4 comprises a wood base 5 with a metal electro-plate 6 or the like secured thereto. Said printing plate is inserted between the two arms and a screw 7, threaded into the upper arm 1, is then rotated by the thumb until the end of the screw touches the printing plate.

The screw has a head 8 having a device 9 provided with a scale 9$^b$ at its edge provided with graduation marks and indices 0, 1, 2, 3, etc., the graduations 1, 2, 3, etc. running in opposite directions from 0. When 0 is at the pointer the gauge is adjusted for the standard thickness of the plate which is .918 of an inch. The screw may be rotated in either direction from its 0 position according to the thickness of the plate, a fixed pointer 10, secured to the arm 2, co-operating with the scale 9$^b$. If the head 8 is rotated in one direction, from the 0 position, the scale indicates the number of layers of paper required to build up the plate to size. If it is necessary to rotate the head in the opposite direction the over-size of the plate is indicated, and if desired the number registered at the pointer may be multiplied by three to give the over-size, in thousandths of an inch, of the plate (three thousandths of an inch being the distance which the screw moves axially while being rotated the angular distance between two adjacent graduations) which over-size is usually brought down by sandpapering the back 5 of the plate.

Provision is made to enable the screw 7 to be manipulated by the same hand in which the gauge is held. To this end the head 8 of the screw is provided with a finger piece 11 to be engaged by the thumb of the operator's hand so that the screw may be rotated in opposite directions from its central position in Fig. 1. It will be seen that the finger piece 11 is located on that side of head 8 of the screw which is nearest the block or body part 3 of the gauge, and that the scale 9 and pointer 10 are at the opposite side of the screw, at the side remote from the hand. Thus the thumb may engage the head of the screw through the finger piece 11 to manipulate said screw without obscuring the scale.

The head 9ª may be formed integral with the screw 7 as in Fig. 4 or it may be adjustably supported on the screw, as in Fig. 3, for adjustment about its axis for initial adjustment of the scale 9b with reference to the screw 7. This adjustment may be secured by inserting a printing plate of proper dimension, then turning down the screw until it engages the plate, then rotating the scale bearing device 9 until 0 thereof registers with the pointer 10. The head 8 is then secured in place by a nut 12, threaded onto a reduced portion 13 of the screw 7, which binds the head against a shoulder 14 of the screw 7, the nut 12 being provided with perforations 15 to receive a tool such as a spanner wrench to tighten the nut. Wear of the end of the screw may also be compensated for by the adjustment of the indicating means.

It will be understood that if the screw were free to make more than a complete revolution it would run the engaging end thereof out of the range of its adjustment. This is prevented however in the present invention by the pointer 10 which is in the path of the finger piece 11.

In a modified form of the invention, Fig. 5, the scale is stationary on the arm 2 of the gauge and the screw 7 is provided with a pointer element 10a having thereon a pointer 10b in a lower plane, the pointer 10b co-operating with a scale 9c on the arm 2 and being adjustable about the axis of the screw 7 and secured in place thereon by a nut 12a. A stop 16 secured to the gauge arm 2 may be engaged by the pointer 10b to prevent turning of the screw 7 out of its range of adjustment, the body of the pointer element 10a being sufficiently high to clear said stop.

It will be understood that in both forms of the invention the finger piece is offset to one side of the screw to form part of a lever arm extending towards the thumb of the hand of the operator by which the gauge is being held, so that the screw may be conveniently operated, the scale and pointer being arranged at the opposite side of the screw so as not to be obstructed by the thumb.

From the foregoing it will be understood that with the gauge of my invention the cut-and-try method and guess work is entirely eliminated since the figures on the dial show the exact number of sheets of paper required to make the printing plate type-high.

It will be understood that a gauge of this kind is an important factor in economy of time required to level up a plate. Furthermore, with this gauge the work of leveling the plates can be done before they are locked up in the frame and ready for press.

It will also be understood that my gauge is small enough to be carried in a pocket of an apron or overalls, and that it is built strong to stand abuse and consequently will last a long time.

While certain preferred embodiments of the invention have been shown and described, it will be understood that changes in the form, arrangements, proportions, sizes and details thereof may be made without departing from the scope of the invention as defined in the appended claims.

I claim:

1. A type high gauge including in combination a body part, two arms extending therefrom between which a piece of work may be placed, a screw extending through one of said arms to engage the work, said screw having a scale at the edge thereof, a pointer secured to the free end of the screw supporting arm and cooperating with said scale, the scale having a central zero mark, and a finger piece on the side of the screw nearest said body part whereby said screw may be manipulated.

2. A type high gauge including in combination a body part, two arms extending therefrom, a screw extending through one of said arms and towards the other, a head on said screw, said head having a scale thereon, a pointer on the screw bearing arm and co-operating with said scale, and a projection on said head by which the screw may be manipulated, said projection co-operating with said pointer to prevent more than a complete revolution of the screw to keep it within a definite range of adjustment with respect to the other arm.

3. A type high gauge incuding in combination a body part, two arms extending therefrom, a screw extending through one of said arms and towards the other arm, a head on said screw, said head having a scale thereon, a pointer on the screw bearing arm and cooperating with said scale, a projection on said head by which the screw may be manipulated, said projection co-operating with said pointer to prevent more than a complete revolution of the screw to keep it within a definite range of adjustment with respect to the other arm, said head being settable circumferentially about the said screw, and means to lock the head in its adjusted position.

4. A type high gauge including in combination a body part, two arms extending therefrom, a screw extending through one of said arms and toward the other arm, a head on said screw, said head having a scale thereon, a pointer on the screw bearing arm and cooperating with said scale, and a projection on said head by which the screw may be manipulated, said projection co-operating with said pointer to prevent more than a complete revolution of the screw to keep it within a definite range of adjustment with respect to the other arm, the body part being adapted to be held in the hollow of the hand of the operative, said projection being located on the side of the head nearest the body part so that it may readily be engaged by the thumb of the same hand to manipulate the screw, the scale and the pointer being located at the opposite side of the head so that the view of the scale and pointer is not obstructed by the thumb while manipulating the screw by said projection.

5. A type high gauge incuding in combination a body part, two parallel superposed arms thereon, the body part being adapted to be held in the hollow of the hand of the operative so that the arms may extend horizontally therefrom, between the thumb and the index finger of the operative's hand, a screw extending downwardly through the upper arm towards the lower arm, a finger piece on said screw, said finger piece being located close to the upper surface of the upper arm and at the side of the screw nearest the body part so that it may readily be engaged by the thumb to rotate the screw to adjust it, and indicating means at the side of the screw farthest away from said body part to register the adjustment of the screw, said indicating means being located to be visible to the operative while the gauge is held in its gauging position.

JOSEPH E. McCONNELL.